(12) United States Patent
Choi et al.

(10) Patent No.: US 9,676,413 B2
(45) Date of Patent: Jun. 13, 2017

(54) APPARATUS FOR CONTROLLING START-UP OF LANE KEEPING ASSISTANCE SYSTEM AND METHOD OF CONTROLLING THE SAME

(71) Applicant: Hyundai Mobis Co., Ltd., Seoul (KR)

(72) Inventors: Kwang Il Choi, Yongin-si (KR); Seung Han Yang, Yongin-si (KR); Dong Ho Song, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/956,570

(22) Filed: Dec. 2, 2015

(65) Prior Publication Data

US 2016/0152266 A1 Jun. 2, 2016

(30) Foreign Application Priority Data

Dec. 2, 2014 (KR) .......................... 10-2014-0170491

(51) Int. Cl.
| | | |
|---|---|---|
| *G06F 19/00* | (2011.01) | |
| *B62D 15/02* | (2006.01) | |
| *G06K 9/00* | (2006.01) | |
| *G06K 9/46* | (2006.01) | |

(52) U.S. Cl.
CPC ....... *B62D 15/025* (2013.01); *G06K 9/00798* (2013.01); *B60T 2201/08* (2013.01); *G06K 9/4652* (2013.01)

(58) Field of Classification Search
CPC ............. B62D 15/025; G06K 9/00798; G06K 9/4652; H04N 7/18; B60T 2201/08
USPC ..................... 701/41; 382/104; 180/422, 446
See application file for complete search history.

(56) References Cited

U.S. PATENT DOCUMENTS

| | | | | |
|---|---|---|---|---|
| 9,150,246 | B2 * | 10/2015 | Lee ...................... | B62D 15/025 |
| 9,168,924 | B2 * | 10/2015 | Lee ...................... | B60W 50/04 |
| 9,180,908 | B2 * | 11/2015 | Van Dan Elzen | |
| 2013/0231830 | A1 * | 9/2013 | Van Dan Elzen .... | B60W 50/14 |
| | | | | 701/42 |
| 2014/0188360 | A1 * | 7/2014 | Lee ........................ | G08G 1/167 |
| | | | | 701/70 |
| 2014/0188366 | A1 * | 7/2014 | Shin ....................... | G08G 1/166 |
| | | | | 701/96 |
| 2015/0057891 | A1 * | 2/2015 | Mudalige .............. | B60W 10/00 |
| | | | | 701/42 |
| 2015/0183458 | A1 * | 7/2015 | Noh ...................... | B62D 5/0487 |
| | | | | 701/43 |

(Continued)

FOREIGN PATENT DOCUMENTS

| | | |
|---|---|---|
| KR | 10-2012-0056158 | 6/2012 |
| KR | 10-2014-0074158 | 6/2014 |

*Primary Examiner* — McDieunel Marc
(74) *Attorney, Agent, or Firm* — H.C. Park & Associates, PLC (57) ABSTRACT

An apparatus for controlling start-up of a lane keeping assistance system (LKAS) which prevents lane departure of a first vehicle includes a detecting unit configured to detect a second vehicle which is traveling in a neighboring lane, a dividing line interposed between the first vehicle and the second vehicle, and a start-up controlling unit configured to determine a weighting factor based on a detection result of the detecting unit, change parameters which control a time point of the start-up of the LKAS based on the determined weighting factor, and control the time point of the start-up of the LKAS based on the changed parameters.

12 Claims, 5 Drawing Sheets

(56) References Cited

U.S. PATENT DOCUMENTS

| | | | |
|---|---|---|---|
| 2015/0360686 A1* | 12/2015 | Kim | B60W 30/09 701/23 |
| 2016/0107597 A1* | 4/2016 | Won | G08G 1/167 340/439 |
| 2016/0132705 A1* | 5/2016 | Kovarik | G06K 7/10376 340/10.3 |
| 2016/0137224 A1* | 5/2016 | You | B62D 15/025 701/41 |

* cited by examiner

APPARATUS FOR CONTROLLING START-UP OF LANE KEEPING ASSISTANCE SYSTEM AND METHOD OF CONTROLLING THE SAME

CROSS-REFERENCE TO RELATED APPLICATION

This application claims priority from and the benefits of Korean Patent Application No. 10-2014-0170491, filed on Dec. 2, 2014, which is hereby incorporated by reference for all purposes as if fully set forth herein.

BACKGROUND

Field

Exemplary embodiments relate to an apparatus for controlling start-up of a lane keeping assistance system (LKAS) and a method of controlling the same.

Discussion of the Background

A lane keeping assistance system (LKAS) is a system which automatically controls the steering of a vehicle, detects a dividing line through a sensor, generates steering torque based on information on the location of the detected dividing line, provides the steering torque to a motor drive power steering system (MDPS), generates a motor torque value (hereinafter referred to as a steering torque value) corresponding to the steering torque by the MDPS, and automatically controls the steering of a vehicle using the generated motor torque.

A recently developed LKAS system generates a steering torque value in consideration of variables such as vehicle velocity and the curvature of the road, in addition to information on the location of a dividing line, and controls a vehicle so that it is maintained within the lane of travel using this steering torque value.

When the LKAS controls the lane keeping of a vehicle without the consideration of whether a neighboring vehicle is traveling close to the vehicle exists or not, a situation in which the vehicle rear-ends the neighboring vehicle may occur.

Figure 1:
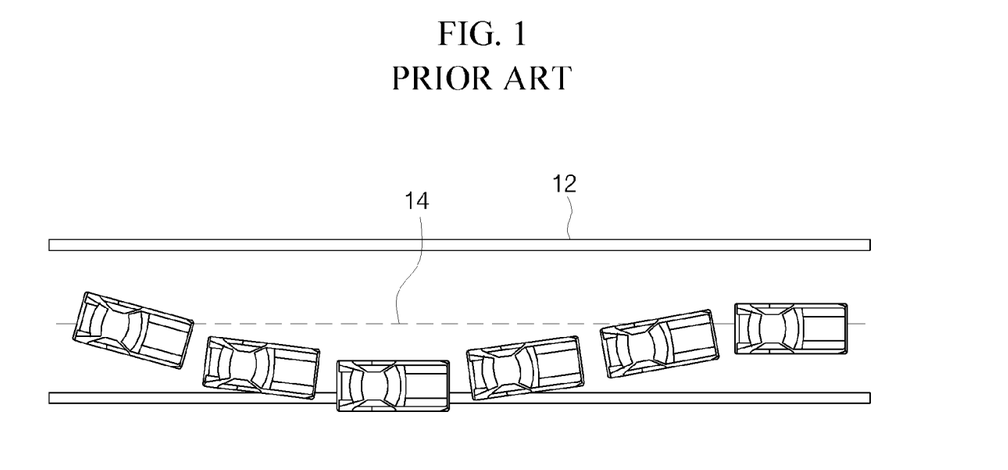
FIG. 1 is a diagram illustrating a movement of a vehicle according to a steering control of a conventional lane keeping assistance system (LKAS).

That is, as shown in FIG. 1, when a vehicle deviates a dividing line 12 and then returns to the original driving lane 14 as a result of the automatic steering control of the LKAS, the vehicle may become a threat to a neighboring vehicle which is traveling in a neighboring lane.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present disclosure is directed to an apparatus for controlling the start-up of a lane keeping assistance system (LKAS) which moves up the time at which control intervention (a time point of the start-up) of the LKAS occurs when the vehicle detects a neighboring vehicle which is traveling in a neighboring lane, so that the apparatus is able to prevent a dangerous situation, such as an accident, between the vehicle and the neighboring vehicle, and a method of controlling the same.

Additional features of the invention will be set forth in the description which follows, and, in part, will be apparent from the description, or may be learned by practice of the inventive concept.

An exemplary embodiment discloses an apparatus for controlling start-up of a lane keeping assistance system (LKAS) which prevents a lane departure of a first vehicle. The apparatus includes a detecting unit configured to detect a second vehicle which is traveling in a neighboring lane, a dividing line interposed between the first vehicle and the second vehicle; and a start-up controlling unit configured to determine a weighting factor based on a detection result of the detecting unit, change parameters which control a time point of the start-up of the LKAS based on the determined weighting factor, and control the time point of the start-up of the LKAS based on the changed parameters.

An exemplary embodiment discloses a method for controlling start-up of a lane keeping assistance system (LKAS). The method includes detecting, by a first vehicle, the existence of a second vehicle which is traveling in a neighboring lane, a dividing line interposed between the first vehicle and the second vehicle; determining a weighting factor ($\alpha$) based on whether the second vehicle exists; changing parameters which control a time point of the start-up of the LKAS based on the determined weighting factor; and controlling the time point of the start-up of the LKAS based on the changed parameters.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements. In the drawings, the size and relative sizes of regions and components may be exaggerated for clarity.

When an element is referred to as being "on," "connected to," or "positioned on" another element or layer, it may be directly on, connected to, or positioned on the other element or intervening elements may be present. When, however, an element is referred to as being "directly on," "directly connected to," or "directly positioned on" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," "left," "right," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "have," "having," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Exemplary embodiments determine whether a neighboring vehicle exists or not, changes a time point of a start-up of control of the LKAS according to a result of the determination, and prevents a lane departure of an own vehicle and a rear-ending between the own vehicle and the neighboring vehicle, and therefore the reliability of performance of the LKAS is improved.

Hereinafter, an embodiment of the present disclosure will be described in detail with reference to the accompanying drawings.

Figure 2:
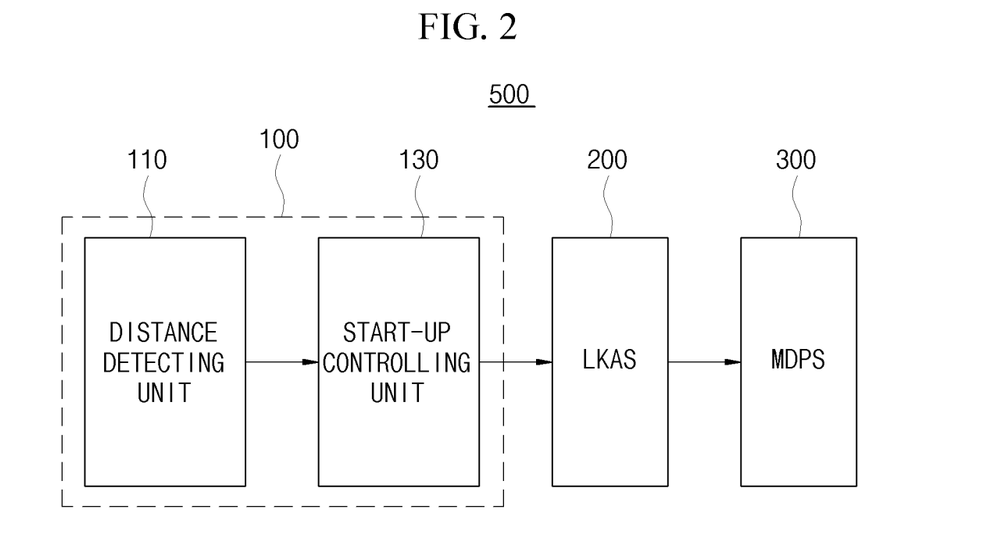
FIG. 2 is a block diagram schematically illustrating an internal configuration of a whole system according to an exemplary embodiment.

FIG. 2 is a diagram schematically illustrating an internal configuration of a whole system according to an exemplary embodiment.

Referring to FIG. 2, the system 500 according to an exemplary embodiment may include an apparatus for controlling start-up 100, a lane keeping assistance system (LKAS) 200, and a motor drive power steering system (MDPS) 300.

The apparatus for controlling start-up 100 may control a time point of the start-up (a time point of a control start-up) of the LKAS 200 based on whether a neighboring vehicle exists or not. The apparatus for controlling start-up 100 may include a detecting unit 110 and a start-up controlling unit 130.

The detecting unit 110 may detect the existence of a neighboring vehicle traveling in a neighboring lane, interpose a dividing line between the own vehicle and the neighboring vehicle, and generate a detection result. Here, the detection result may include information on the distance from the own vehicle to the neighboring vehicle. The detecting unit 110 may be an ultrasonic sensor, a laser sensor, etc. to generate the detection result.

The start-up controlling unit 130 may control the time point of the start-up of the LKAS 200 based on the detection result of the detecting unit 110. The start-up controlling unit 130 may determine a weighted factor based on the detection result of the detecting unit 110 to control the time point of the start-up, change parameters which control the time point of start-up of the LKAS based on the determined weighting factor, and control the time point of the start-up of the LKAS based on the changed parameters.

The LKAS 200 may generate steering torque for controlling the steering of a vehicle at the time point of start-up determined by the start-up controlling unit 130.

The MDPS 300 may receive steering torque generated by the LKAS 200, generate a motor torque corresponding to the steering torque, and control the steering of the own vehicle using the generated motor torque to control the lane departure of the own vehicle.

Hereinafter, a process of controlling a time point of the start-up of the LKAS 200 performed by the start-up controlling unit 130 will be described in detail.

Figure 3:
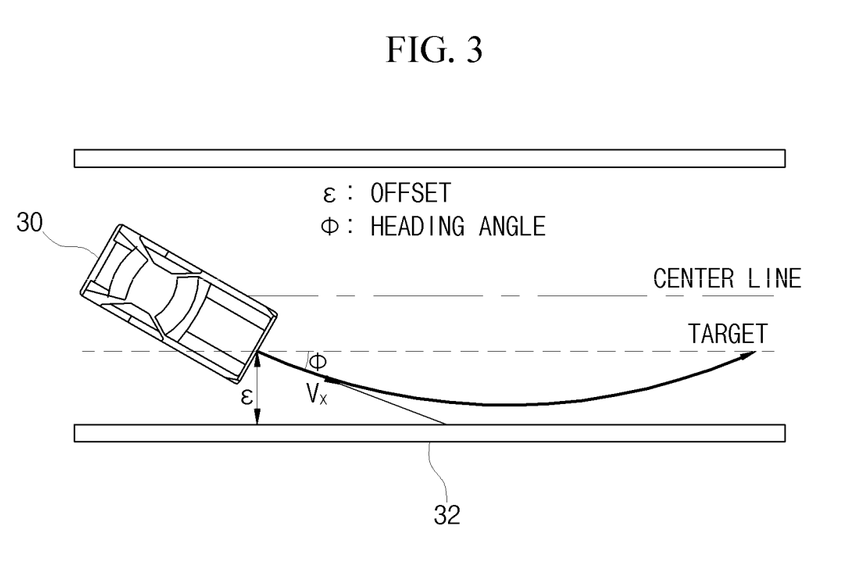
FIG. 3 is a diagram illustrating parameters used in changing a time point of start-up of the LKAS by an apparatus for controlling start-up shown in FIG. 2.

FIG. 3 is a diagram illustrating parameters used in changing a time point of start-up of the LKAS by an apparatus for controlling start-up shown in FIG. 2.

Referring to FIG. 3, the time point of start-up of the LKAS 200 may be determined based on parameters including a distance to lane boundary (DTLB) and a time to lane crossing (TTLC).

The DTLB is a real offset value $\epsilon$ which represents a distance from the first vehicle 30 to the dividing line 32, and the real offset value (hereinafter referred to as "a first offset value") is a variable which represents a distance from a virtual center point formed on the front side of the first vehicle 30 to the dividing line 32.

The TTLC is an expected time (or a lane departure time) required for the first vehicle 30 to arrive at the dividing line 32 based on the first offset value $\epsilon$.

As shown in FIG. 3, the angle formed by a traveling direction of the first vehicle 30 and the dividing line 32 is given by $\Phi$, and a velocity of the first vehicle 30 is given by Vx, the TTLC may be denoted as Equation 1 shown below.

$$TTLC = \frac{\varepsilon}{V_x \sin\Phi} [\sec], \quad DTLB = \varepsilon[m] \quad \text{Equation 1}$$

Figure 4A:
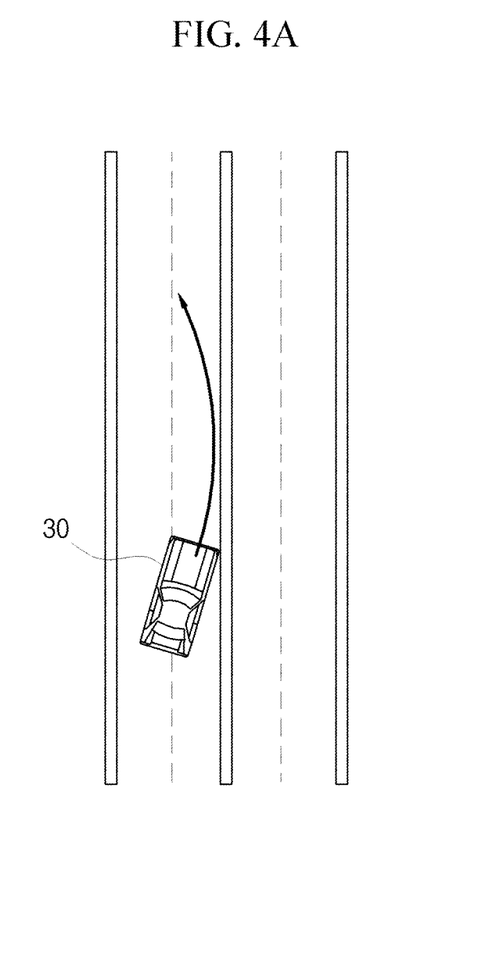
FIGS. 4A and 4B are diagrams illustrating conditions for changing the start-up time of the LKAS according to an exemplary embodiment.
Figure 4B:
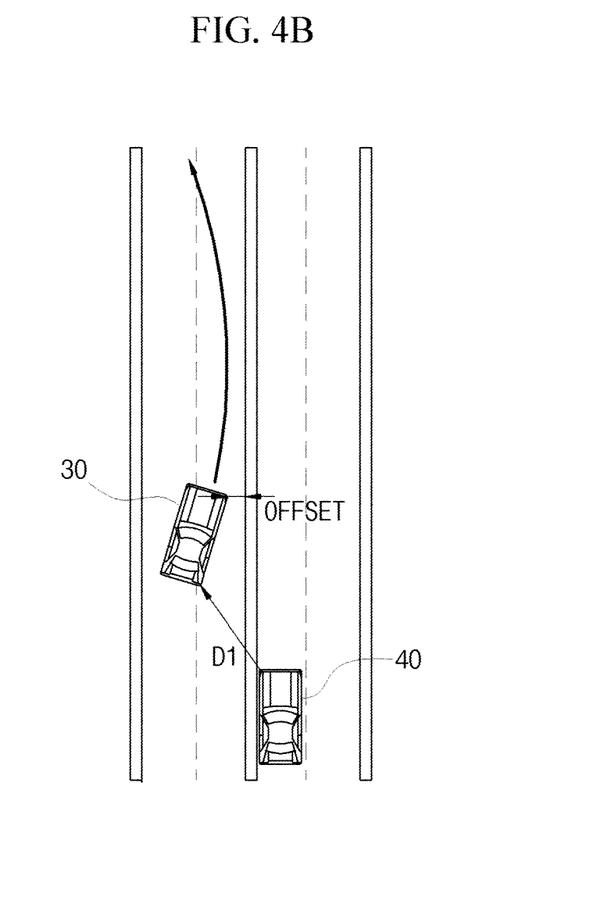

In an exemplary embodiment, as shown in FIG. 4B, when the first vehicle 30 detects a second vehicle 40 (e.g., a rear vehicle) which is traveling in a neighboring lane through an ultrasonic sensor, a distance between the first vehicle 30 and the second vehicle 40 may be detected, and then a weighting factor α is determined based on the detected distance.

An offset value (hereinafter referred to as a second offset value) ε' (Cal Offset) corrected by the weighting factor α may be denoted as Equation 2 shown below.

$$\varepsilon'(\text{Cal Offset}) = \alpha \times \varepsilon(\text{real offset})$$

$$\text{weighting factor}(\alpha) 0 < \alpha \leq 1, f(D1) = \alpha \quad \text{Equation 2}$$

Here, D1 denotes a distance between the first vehicle 30 and the second vehicle 40, which may be obtained by an ultrasonic sensor, f(D1) is a function denoting a proportional relationship between the weighting factor α and D1. That is, the weighting factor α becomes smaller as D1 becomes smaller.

When the offset value ε' corrected according to Equation 2 is applied to the TTLC and DTLB, the possibility of colliding with the rear car traveling in a neighboring lane may be lowered.

In exemplary embodiments, when the calculated weighting factor α is given by a first weighting factor α1 when the first vehicle 30 does not detect the second vehicle 40 as shown in FIG. 4A and the calculated weighting factor α is given by a second weighting factor α2 when the first vehicle 30 detects the second vehicle 40 as shown in FIG. 4B, the first weighting factor α1 is set to be 1 and the second weighting factor α2 is set to be a value smaller than 1.

When the first vehicle 30 detects the second vehicle 40, the second offset value ε' which is smaller than the first offset value ε which is a real offset is applied to the TTLC and TTLB, and therefore the time point of the start-up (the time point of the control start-up) of the LKAS can be moved up.

Figure 5:
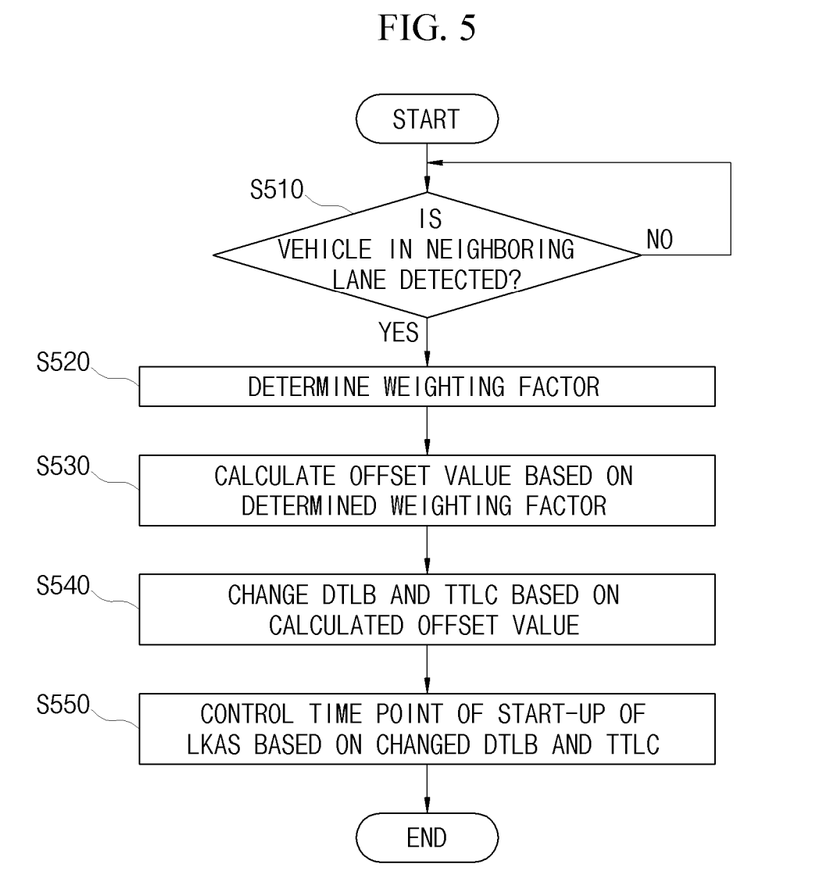
FIG. 5 is a flow chart illustrating a method for controlling the start-up of the LKAS according to an exemplary embodiment.

FIG. 5 is a diagram illustrating a method for controlling start-up of the LKAS according to an exemplary embodiment.

Referring to FIG. 5, first, a process of detecting whether a neighboring vehicle (e.g., the second vehicle 40, which may be a vehicle behind the first vehicle 30) which is traveling in the neighboring lane exists or not using an ultrasonic sensor may be performed (S510).

When existence of the neighboring vehicle is detected, a process of determining a weighting factor using Equation 2 may be performed (S520).

An offset value is calculated based on the determined weighting factor (S530), and the TTLB and DTLC may be changed based on the calculated offset value (S540).

A process of controlling the time point of the start-up of the LKAS based on the changed DTLB and the TTLC may then be performed (S550).

According to exemplary embodiments, a time point of start-up of the LKAS may be changed based on whether a neighboring vehicle which is traveling exists or not. When the own vehicle deviates a dividing line in a state in which the neighboring vehicle exists, a time point of control start-up (a time point of start-up) of the LKAS is moved up, and the performance of the LKAS may be improved.

The system 500 and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, system 500 and/or one or more components thereof may include or otherwise be associated with one or more memories (not shown) including code (e.g., instructions) configured to cause the system 500 and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An apparatus for activating a lane keeping assistance system (LKAS) which prevents a lane departure of a first vehicle, the apparatus comprising:
a sensor and a processor coupled to the sensor, wherein the processor is configured with processor-executable instructions to perform operations comprising:
receiving a detection signal from the sensor;
detecting whether a second vehicle is traveling in a neighboring lane based on the received detection signal;
generating a dividing line interposed between the first vehicle and the second vehicle based on the detection of the second vehicle;
determining a weighting factor (α) based on the dividing line; and
calculating a time to start-up the LKAS based on the weighting factor (α).

2. The apparatus of claim 1, wherein the processor is further configured to perform operations comprising:

calculating a first offset value ($\epsilon$) which represents a distance from the first vehicle to the dividing line; and calculating a time to lane crossing (TTLC), which represents an expected time required for the first vehicle to arrive at the dividing line, based on the first offset value ($\epsilon$) and the weighting factor ($\alpha$).

3. The apparatus of claim 2, wherein the processor is further configured to perform operations comprising:

multiplying the weighting factor ($\alpha$) and the first offset value ($\epsilon$) to determine a second offset value ($\epsilon'$); and replacing the first offset value ($\epsilon$) with the second offset value ($\epsilon'$).

4. The apparatus of claim 2, wherein the processor is further configured to perform operations comprising:

calculating a first weighting factor ($\alpha_1$) when the second vehicle is not detected; and calculating a second weighting factor ($\alpha_2$) which is smaller than the first weighting factor ($\alpha_1$) when the second vehicle is detected.

5. The apparatus of claim 4, wherein the second weighting factor ($\alpha_2$) is proportional to a distance from the first vehicle to the second vehicle.

6. The apparatus of claim 1, wherein the sensor is an ultrasonic sensor.

7. The apparatus of claim 1, wherein the sensor is a laser sensor.

8. A method for activating a lane keeping assistance system (LKAS) configured to be applied to a first vehicle, the method comprising:

receiving, by a processor of an apparatus, a detection signal from a sensor of the apparatus;

detecting, by the processor, whether a second vehicle is traveling in a neighboring lane based on the received detection signal;

generating, by the processor, a dividing line interposed between the first vehicle and the second vehicle based on the detection of the second vehicle;

determining a weighting factor ($\alpha$) based on the dividing line; and calculating, by the processor, a time to start-up the LKAS based on the weighting factor ($\alpha$).

9. The method of claim 8, wherein calculating the time to start up the LKAS further comprises:

calculating, by the processor, a first offset value ($\epsilon$) which represents a distance from the first vehicle to the dividing line; and calculating, by the processor, a time to lane crossing (TTLC), which represents an expected time for the first vehicle required to arrive at the dividing line, based on the first offset value ($\epsilon$) and the weighting factor ($\alpha$).

10. The method of claim 9, wherein calculating the time to start-up the LKAS further comprises:

multiplying, by the processor, the weighting factor ($\alpha$) and the first offset value ($\epsilon$) to determine a second offset value ($\epsilon'$); and replacing, by the processor, the first offset value ($\epsilon$) with the second offset value ($\epsilon'$).

11. The method of claim 8, wherein determining the weighting factor ($\alpha$) further comprises:

calculating, by the processor, a first weighting factor ($\alpha_1$) when the second vehicle is not detected; and calculating, by the processor, a second weighting factor ($\alpha_2$) which is smaller than the first weighting factor ($\alpha_1$) when the second vehicle is detected.

12. The method of claim 11, wherein the determining of the weighting factor ($\alpha$) further comprises:

determining, by the processor, that the second weighting factor ($\alpha_2$) is proportional to a distance from the first vehicle to the second vehicle.

* * * * *